(12) United States Patent
Muehlegger (10) Patent No.: US 9,995,346 B2
(45) Date of Patent: Jun. 12, 2018

(54) CLUTCH DISC

(71) Applicant: Miba Frictec GmbH, Laakirchen (AT)

(72) Inventor: Markus Muehlegger, Pinsdorf (AT)

(73) Assignee: Miba Fritec GmbH, Laakirchen (AT)

( * ) Notice: Subject to any disclaimer, the term of this patent is extended or adjusted under 35 U.S.C. 154(b) by 232 days.

(21) Appl. No.: 14/913,546

(22) PCT Filed: Aug. 20, 2014

(86) PCT No.: PCT/AT2014/050179
§ 371 (c)(1),
(2) Date: Feb. 22, 2016

(87) PCT Pub. No.: WO2015/024039
PCT Pub. Date: Feb. 26, 2015

(65) Prior Publication Data
US 2016/0201735 A1    Jul. 14, 2016

(30) Foreign Application Priority Data
Aug. 23, 2013 (AT) .............................. A 50523/2013

(51) Int. Cl.
*F16D 13/64* (2006.01)
(52) U.S. Cl.
CPC ........ *F16D 13/64* (2013.01); *F16D 2013/642* (2013.01)
(58) Field of Classification Search
CPC ........................... F16D 13/64; F16D 2013/642
(Continued)

(56) References Cited

U.S. PATENT DOCUMENTS 3,696,902 A * 10/1972 Dantele ................... F16D 13/64
                                                  192/107 C
4,726,455 A    2/1988 East
(Continued)

FOREIGN PATENT DOCUMENTS

CN           86100154 A     7/1986
CN            1120133 A     4/1996
(Continued)

OTHER PUBLICATIONS

International Search Report of PCT/AT2014/050179, dated Jan. 19, 2015.

*Primary Examiner* — Richard M Lorence
(74) *Attorney, Agent, or Firm* — Collard & Roe, P.C.

(57) ABSTRACT

The invention relates to a clutch disk (1) for a friction clutch, comprising a disk-shaped main part (2) with a support element (5), which support element (5) has an outer circumference (6) over which multiple receiving areas (7) for wing-like friction components (8) are distributed, the friction components (8) being connected to the support element (5), and each friction component (8) has a first friction lining (12) and a second friction lining (13), and the first friction linings (12) are arranged on first friction lining supports (14), the first friction lining supports (14) are connected to a spring element (16) and the spring elements (16) are connected to the support element (5), and the second friction linings (13) are arranged on second friction lining supports (15), and furthermore the spring elements (16) are arranged between the first and the second friction lining supports (14, 15) and the second friction lining supports (15) are directly connected to the support element (5).

7 Claims, 3 Drawing Sheets

(58) Field of Classification Search
USPC .................................................. 192/107 C
See application file for complete search history.

(56) References Cited

U.S. PATENT DOCUMENTS

| | | | |
|---|---|---|---|
| 4,941,558 A | | 7/1990 | Schraut |
| 5,048,659 A | | 9/1991 | Tojima |
| 5,355,985 A | | 10/1994 | Thirion De Briel et al. |
| 5,857,551 A | | 1/1999 | Yoneda |
| 5,927,459 A | * | 7/1999 | Kajitani ............... F16D 13/583 |
| | | | 192/107 C |
| 6,015,035 A | | 1/2000 | Mizukami |

FOREIGN PATENT DOCUMENTS

| | | | |
|---|---|---|---|
| CN | 1729363 A | 2/2006 |
| DE | 2 354 152 A1 | 5/1974 |
| DE | 29 20 095 A1 | 11/1980 |
| DE | 87 13 810 U1 | 12/1987 |
| DE | 43 19 150 A1 | 12/1993 |
| DE | 198 55 698 A1 | 6/1999 |
| DE | 100 41 216 A1 | 3/2002 |
| DE | 102 43 718 A1 | 3/2004 |
| EP | 0 311 844 A2 | 4/1989 |
| FR | 2 685 416 A1 | 6/1993 |
| GB | 1 404 354 A | 8/1975 |
| GB | 2 278 894 B | 12/1997 |

* cited by examiner

CLUTCH DISC

CROSS REFERENCE TO RELATED APPLICATIONS

This application is the National Stage of PCT/AT2014/050179 filed on Aug. 20, 2014, which claims priority under 35 U.S.C. § 119 of Austrian Application No. A 50523/2013 filed on Aug. 23, 2013, the disclosure of which is incorporated by reference. The international application under PCT article 21(2) was not published in English.

The invention relates to a clutch disk for a friction clutch, comprising a disk-shaped main part with a support element, which support element has an outer circumference over which multiple receiving areas for wing-like friction components are distributed, the friction components being connected to the support element, and each of the friction components has a first friction lining and a second friction lining, and the first friction linings are arranged on first friction lining supports, the first friction lining supports are connected to a spring element and the spring elements are connected to the support element, and the second friction linings are arranged on second friction lining supports and furthermore the spring elements are arranged between the first and the second friction lining supports.

Numerous designs for clutch disks with friction linings have already been described in the prior art.

For example, DE 29 20 095 A1 describes a friction lining mounting, in particular for metal or metal-ceramic friction linings, for clutch disks of motor vehicles, amongst other things comprising friction linings secured in mountings which are disposed in opposite pairs on lining spring supports, and two identical lining supports are respectively disposed in an alternating arrangement with their cambered regions convexly facing one another, and every friction lining is connected to its respective lining support by its mounting by means of at least two rivets and all the rivets of the two oppositely lying lining supports are distributed across the available surface in such a way that a symmetrical distribution is obtained relative to a center line of the lining supports, in particular without any mutual overlap. In the region where the rivets of the oppositely lying lining supports extend, each lining support has co-operating orifices. In addition, the mountings of the friction linings also have orifices disposed congruently with the lining supports. Disposed between the two lining supports on the center line is at least one spacer rivet for pre-tensioning the lining support.

Friction linings are primarily mounted on spring-biased lining supports so that the metal or metal-ceramic friction linings do not experience impacts or shocks as they mesh, which under certain circumstances can lead to premature damage to these friction linings. Such metal or metal-ceramic friction linings are much less elastic than other friction linings made from resin-bonded fibers for example. On the other hand these metal or metal-ceramic friction linings do have an advantage over other friction linings insofar as they are capable of transmitting higher torques. However, the spring-biased mounting of friction linings also enables control of the clutch to be improved as it is engaged.

Various embodiments of a clutch disk are known from U.S. Pat. No. 5,857,551 A. Based on a first embodiment, the friction linings are distributed on three friction components and two friction linings are disposed adjacent to one another on the lining supports in the circumferential direction, as may be seen in FIG. 2 of U.S. Pat. No. 5,857,551 A. In the case of this embodiment of the clutch disk disclosed in U.S. Pat. No. 5,857,551 A, the two friction linings are not each disposed on separate wing-like lining supports as described in DE 29 20 095 A1 mentioned above.

The friction linings based on this first embodiment of the clutch disk specified in U.S. Pat. No. 5,857,551 A are secured to the lining supports by a press-fit on the one hand and by rivets on the other hand, and the actual friction linings themselves are sintered onto friction lining supports. In order to press-fit the friction lining supports with the lining supports, the latter are unbent on three sides and also have a bent tab so that the friction lining support is joined to the lining supports by a positive fit on all sides.

Based on this embodiment, the friction linings are spring-supported as described in DE 29 20 095 A1 and on the other hand are rigidly secured by means of the press-fit.

U.S. Pat. No. 5,857,551 A describes yet another embodiment of a clutch disk which, similarly to that described in DE 29 20 095 A1, has two friction linings each disposed on separate wing-like lining supports. In the case of this embodiment, which is illustrated in FIG. 5 of U.S. Pat. No. 5,857,551 A, the lining supports are therefore only about half the size of those used for the first embodiment. In this connection, U.S. Pat. No. 5,857,551 A states that all the friction linings are secured in a spring-supported arrangement, as already known from DE 29 20 095 A1. Accordingly, a part of the friction linings is secured in a rigid arrangement.

The underlying objective of this invention is to improve a clutch disk of the type outlined above, in particular with regard to its friction characteristics.

In order to achieve this objective, the second friction lining supports of the clutch disk outlined above are directly connected to the support element.

The advantage of this is that because of the rigid arrangement of the second friction linings on the one hand and due to the fact that the friction lining supports used for the second friction linings known from the prior art are dispensed with, the deflection on the internal diameter of the friction components is reduced compared with the prior art and at the same time is increased at the external diameter of the friction components. As a result, the effective friction radius in the first instant of engagement is increased, which means that the torque which can be transmitted in this time can likewise be increased as a result. On the other hand, however, greater reliability of the torque transmission can be achieved, which is of particular importance when engaging the clutch disk at low friction values. The fact that the friction lining supports are directly connected to the support element of the main part of the clutch disk also means that for the same mounting space . . . compared with clutch disks known from the prior art—the second friction linings can be made to a thicker design so that they have a higher wear volume, in other words the clutch disk can be operated for a longer period of time. Conversely, for the same layer thickness of the second friction linings and the friction linings known from the prior art, the weight of the clutch disk proposed by the invention can be reduced, thereby reducing inertia, as a result of which the clutch behavior and friction characteristics of the clutch disk can also be improved.

As a result of the invention, it is therefore possible to dispense with the friction linings supports referred to as core plates in U.S. Pat. No. 5,857,551 A for the second friction linings. Based on the embodiment of the clutch disk described in U.S. Pat. No. 5,857,551 A, it would not be possible to dispense with these because these core plates are necessary for the press-fit connection to the support elements which are riveted to the main part of the clutch disk, given that the friction lining itself could not be press-fitted directly onto the support element due to the material properties of the friction lining, and the friction volume of the friction linings would be significantly reduced as a result because the friction linings can only be worn as far as the bent edges.

Based on one embodiment of the clutch disk, the second friction linings are connected to the second friction lining supports by a firmly bonded connection or by means of an adhesive bond. Connecting the second friction linings to the second friction lining supports without rivets means that the available wear volume of the friction linings can be further increased so that the service life of the clutch disk can likewise be increased.

The second friction lining supports may also be bigger than the second friction linings so that the second friction linings are disposed on the friction lining support spaced at a distance apart from adjacently disposed side edges thereof in the direction of the outer circumference, and the side edges of the friction lining support are bent. By contrast with the embodiment of a clutch disk described in U.S. Pat. No. 5,857,551 A, the bent side edges are not provided as a means of press-fitting the core plates of the friction linings to the friction lining supports. The larger second friction lining supports enable greater stability to be imparted to the wing-like friction components. The bends of the side edges are of advantage because for a slimmer layer thickness, the second friction lining support is more resistant to deformation at higher speeds, which means that the second friction linings are also subjected to less or no deformation at higher speeds. By preventing so-called "hot spots", this in turn makes for more even wear of the second friction linings. This enables a longer service life of the clutch disk to be achieved. In addition with this embodiment, the air space can be more easily maintained, thereby (better) enabling the generation of drag torques to be prevented.

Based on one embodiment, the second friction lining support may have at least one orifice in the region between the bent side edges and the second friction linings. This reduces the weight of the second friction lining support, as a result of which a relatively low inertia can be achieved even with relatively large second friction lining supports. Furthermore, cooling of the second friction linings can also be improved due to the orifice.

Based on another embodiment, the first friction linings may be connected to the first friction lining supports and the spring elements by means of at least four rivets. By contrast with standard diagonal riveting known from the prior art, using at least four rivets means that bending of the first friction linings due to the effect of centrifugal force can be significantly reduced or prevented altogether. The four rivets are preferably smaller than those used for diagonal riveting.

Furthermore, all of the first friction linings may be disposed on a first side of the friction component—as viewed in the axial direction of the clutch disk—and all of the second friction linings may be disposed on a second side of the friction components lying opposite the first side and/or the first friction linings and the second friction linings have friction surfaces of the same size and are disposed in the friction components in a mutually overlapping arrangement in the axial direction of the clutch disk. Both embodiments offer improved friction characteristics because the friction components can be fitted in the clutch disk in a symmetrical arrangement.

Alternatively, the first friction linings and the second friction linings may be disposed on a first side of the friction component and on a second side of the friction components lying opposite the first side—as viewed in the axial direction of the clutch disk—and the first friction linings and the second friction linings are disposed in an alternating arrangement in the circumferential direction of the clutch disk. As a result of this, the clutch disk lifts off the counterplate when venting the clutch, which in turn (better) prevents the creation of a drag torque. Wear of the friction linings is reduced as a result.

To provide a clearer understanding, the invention will be described in more detail with reference to the appended drawings.

These are schematically simplified diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Figure 1:
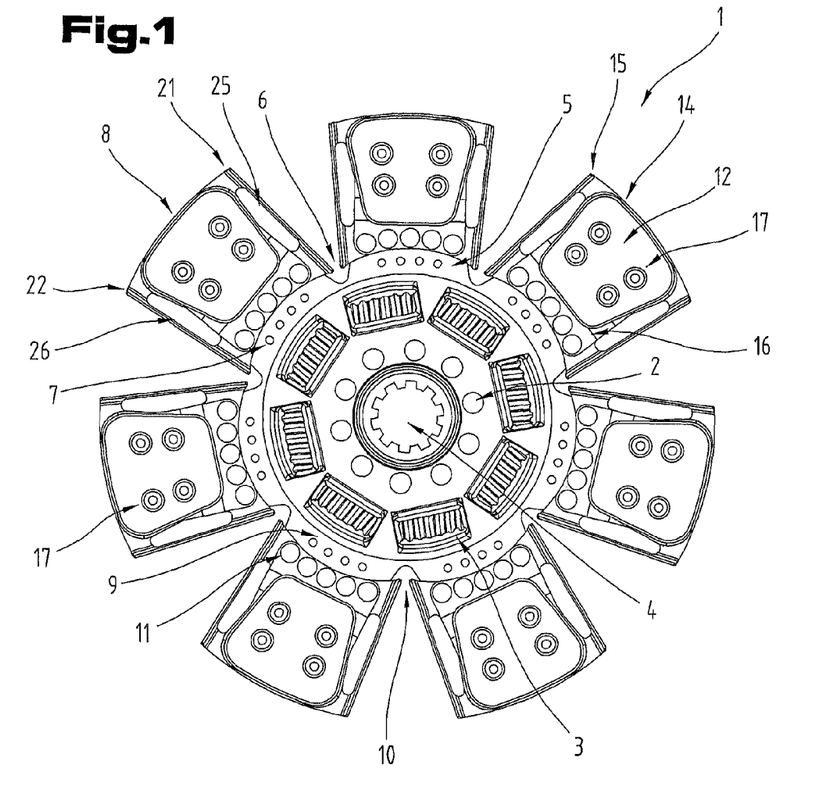
FIG. 1 a view in the axial direction illustrating a first embodiment of a clutch disk.

FIG. 1 illustrates a first embodiment of a clutch disk 1 for a friction clutch of the type known from the prior art.

The clutch disk 1 essentially corresponds to those known from the prior art. By "essentially" in this context is meant that there are differences in terms of the mounting in relation to the friction linings disposed on the outside . . . as will be explained in more detail below.

Accordingly, the clutch disk 1 has a disk-shaped main part 2 in particular. Disposed on or in the main part 2 are several torsion springs 3. Furthermore, a centrally disposed orifice 4 is provided for accommodating a shaft, although this is not illustrated. Since this is known in principle from the prior art, reference may be made to the relevant literature for further details.

The main part 2 comprises a disk-shaped support element 5. The support element 5 is disposed at least in the region of an outer circumference 6 of the main pate 2. By preference, the support element 5 extends across the entire main part 2, in other words from the orifice 4 as far as the outer circumference 6. The orifice 4 is therefore preferably (also) provided in the support element 5. The torsion springs 3 are preferably disposed in co-operating housings in the support element 5.

Another option is to provide cover elements (not illustrated), in particular of a disk-shaped design, on both sides of the support element 5 at least in certain regions.

The support element 5 is preferably made from sheet metal, in particular sheet steel.

It is also preferable if the support element 5 is made from a single piece rather than made up of several parts.

Distributed around the outer circumference 6 of the support element 5, in particular in a regular layout, are multiple receiving areas 7 for accommodating wing-like friction components 8. In the specific example of the clutch disk illustrated in FIG. 1, there are seven receiving areas 7 and consequently seven friction components 8. However, this number should not be seen as restricting the invention in any way. It would also be possible to provide more or fewer receiving areas 7 and friction components 8.

The receiving areas 7 are provided in the form of flanges 9 projecting out from the support element 5 in the radial direction and in particular made integrally with it. Disposed between the flanges 9 are recesses 10 so that the individual flanges 9 are not connected to one another in the circumferential direction. A separate flange 9 is provided on the support element 5 for each friction component 8.

The friction components 8 are connected to the support element 5 in the receiving areas 7. To this end, bores are preferably provided in both the flanges 9 and the friction components 8 so that each friction component 8 is connected respectively to a flange 9 by means of several rivets 11 extending through these bores.

Instead of the rivets 11 or in addition to them, fixing, i.e. the connection of the friction components 8 to the flanges 9 of the support element 5, may also be provided in the form of a positive connection, for example by bending the end region of the friction component facing the receiving area 7, in particular of a friction lining support, by at least approximately 90° to enable insertion in a co-operating, slit-shaped housing of the receiving area 7. However, the positive connection may also be provided in the form of a dovetail design of the end region of the friction components which locates in recesses of a matching shape in the receiving areas 7.

The support element 5 of the clutch disk 1 does not therefore extend as far as its outer circumference or external diameter.

In principle, there are also other methods by which the friction components 8 can be connected to the flanges 9, such as screw fittings, welding, etc., for example.

At the outer circumference 6 facing the friction components 8, the flanges 9 are preferably at least approximately of a circular shape, as may be seen in FIG. 1. In principle, however, they may also have a different contour.

Each of the friction components 8 of the clutch disk 1 constitutes a separate component. As may be seen in particular from the cross-section illustrated in FIG. 2, the friction components 8 comprise a first friction lining 12, a second friction lining 13, a first friction lining support 14, a second friction lining support 15 and a spring element 16.

Figure 2:
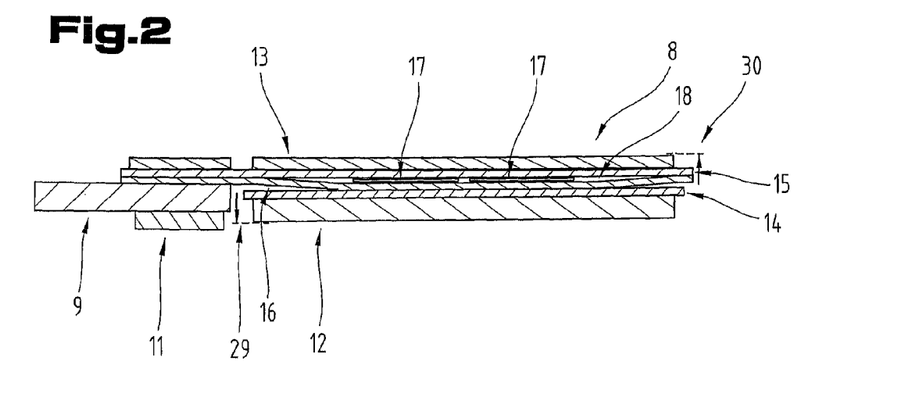
FIG. 2 a cross-section through a wing-like friction component of the clutch disk illustrated in FIG. 1.

Each friction component 8 therefore has only one first friction lining 12 and only one second friction lining 13 respectively.

All the friction components 8 of the clutch disk 1 are preferably of the same design.

The first friction lining 12 is connected to the first friction lining support 14 and in particular is sintered onto it. However, other connection methods could also be used. For example, the first friction lining 12 may be adhered to the first friction lining support 14 or connected to it by a firmly bonded connection, for example soldered. Another option is riveting (or optionally a screw connection) as a means of connecting the first friction lining 12 to the first friction lining support 14.

The first friction lining support 14 is preferably riveted onto the spring element 16, for which purpose rivets 17 are provided.

The spring element 16 is disposed between the first friction lining support 14 and the second friction lining support 15 and the disposition may be such that sufficient space is provided for the rivets 17. To This end, the spring element 16 may be bent accordingly, as illustrated in FIG. 2, so that a gap 18 is created between the spring element 14 and the second friction lining support 15.

Alternatively, it would also be possible to provide appropriate recesses in the first friction lining support 14 to accommodate the rivet heads of the rivets 17 so that the rivet heads do not stand proud on the first friction lining support 14.

The second friction lining 13 is connected to the second friction lining support 15. The connection is preferably a firmly bonded connection, in particular by soldering, or an adhesive bond. It is preferable if the second friction lining 13 is not connected to the second friction lining support 15 by riveting and is therefore free of rivets.

Both the spring element 16 and the second friction lining support 15 are connected directly to the support element 5, i.e. to the respective flange 9, by means of rivets 11 and/or a positive connection in the manner described above, for which purpose the spring element 16 and the second friction lining support 15 lie directly abutting with one another in this connection region, as may be seen in FIG. 2. The spring element 16 and the second friction lining support 15 preferably terminate flush with one another in this connecting to the flange 9, as may also be seen in FIG. 2.

As a result of this arrangement, i.e. fixing of the first and second friction linings 12, 13, a rigid side is obtained in the region of the second friction linings 13 and a resilient side is obtained in the region of the first friction linings 12 in the friction component 8.

The friction components 8 are disposed on the support element 5 in an at least approximately star-shaped layout, as may be seen in FIG. 1.

The first friction linings 12 and the second friction linings 13 are preferably made from a metal or metal-ceramic sintered material of the type used as standard for this purpose. However, it would also be possible to make them from other materials, e.g. resin-bonded fibers. These other types of friction linings are also described in detail in the relevant literature and no further description will be given here.

Reference may also be made to the relevant literature for details of the adhesives used to produce the bonded connections since the methods by which friction linings are bonded are known per se.

The first friction lining supports 14 may be made from an iron-based material, for example steel, in particular structural steel or heat-treated steel.

The second friction lining supports 15 are preferably brazing sheets, e.g. made from an iron-based material, for example steel, in particular structural steel or heat-treated steel.

The spring elements 16 may be made from spring steel, in particular one which is heatresistant.

Figure 3:
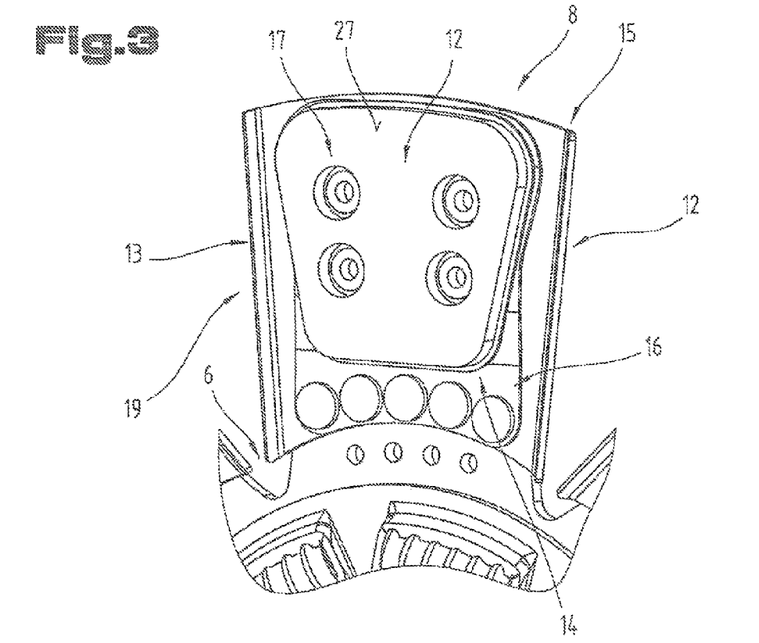
FIG. 3 a detail of an embodiment of a clutch disk viewed at an angle from a first side.
Figure 4:
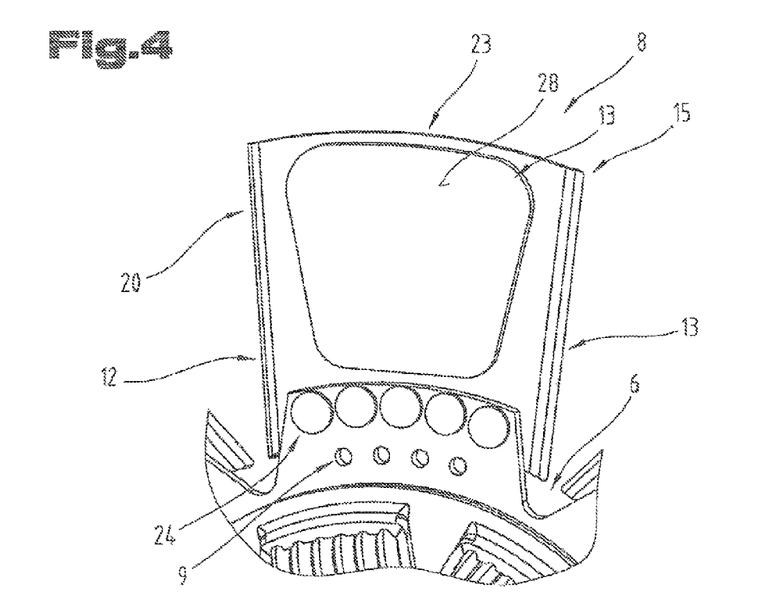
FIG. 4 the detail of an embodiment of the clutch disk in FIG. 3 viewed at an angle but viewed from a second side.

FIGS. 3 and 4 illustrate another embodiment of a friction component 8 which may be construed as an independent embodiment in its own right, the same component names and reference numbers being used to denote parts that are the same as those described in connection with FIGS. 1 and 2. To avoid unnecessary repetition, reference may be made to the more detailed description of FIGS. 1 and 2 given above.

The embodiment of the friction component 8 illustrated in FIGS. 3 and 4 is shown at an angle viewed from two sides so that the first friction lining 12 can be seen in the view onto a first side 19 (FIG. 3) and the second friction lining 13 can be seen in a view onto a second side 20 (FIG. 4). Also visible in FIG. 3 are the spring elements 16 and the second friction lining support 15, which is preferably significantly bigger than the first friction lining 12 and second friction lining 13 in terms of surface. Again, the first friction lining 12 is connected to the first friction lining support 14.

As clearly illustrated, the second friction lining support 15 based on the preferred embodiment has bent side edges 21, 22, the two side edges 21, 22 being bent in the same direction. The two side edges 21, 22 are preferably bent in the direction towards the side 19, in other words in the direction in which the first friction lining 12 is disposed, i.e. the riveted friction lining 12. As a result of this, the wear volume available on the second friction lining is not reduced by the bent side edges 21, 22.

As may also be seen from FIGS. 3 and 4, the second friction lining support is significantly bigger than the second friction lining 13 and the first friction lining 12 so that the second friction linings 13 and the first friction linings 12 are spaced at a distance apart from the adjacently disposed side edges 21, 22 of the second friction lining supports 15 on which they are disposed in the direction of the outer circumference 6.

For the sake of completeness, it should be pointed out that the two side edges 21, 22 of the second friction lining supports 15 extend approximately perpendicular to the circumferential direction. By this is meant that there is an outermost end face 23 and an inner end face 24 in the region of the flanges 9.

As may be seen from FIG. 1, the embodiment of the clutch disk illustrated in FIG. 1 also has the same second friction lining supports 15 as those illustrated in FIGS. 3 and 4 but with the difference that the second friction lining supports 15 have at least one orifice 25, 26 in the region between the bent side edges 21, 22 and the first friction linings 12 respectively second friction linings 13 (not visible in FIG. 1). It is preferable if at least one orifice 25, 26 is provided in the second friction lining support 15 in the region of every side edge. The orifices 25, 26 are preferably provided in the form of cut-outs.

As may also be seen from FIGS. 1 and 3, the first friction linings 12 are connected to the first friction lining supports and the spring elements 16 by means of at least four rivets 17 which are countersunk in the first friction linings 12.

Another option would be to provide only two rivets 17 although this is not the preferred embodiment. In this case, the two rivets 17 are preferably diagonally disposed, as may be seen in FIG. 5.

If at least four rivets 17 are used, these are smaller than those used if only two rivets 17 are provided.

Figure 6:
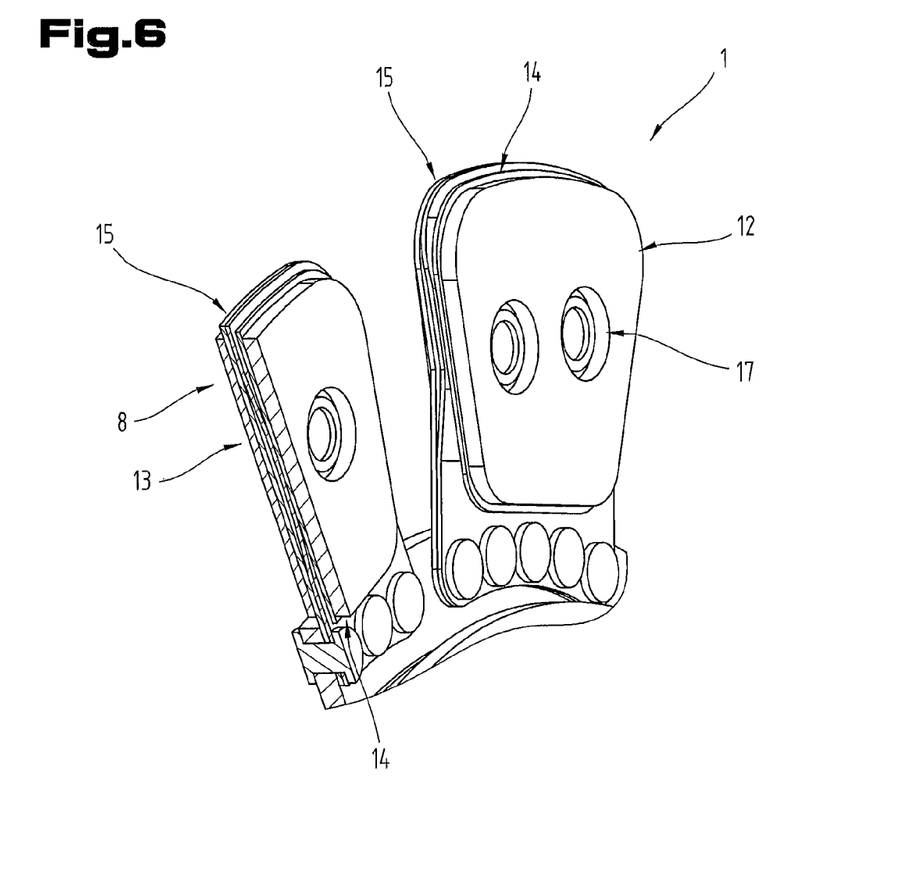
FIG. 6 a detail of another embodiment of a clutch disk viewed from an angle and in partial section.

It is also possible for the two rivets 17 to be disposed at the same radial height, as may be seen from FIG. 6 illustrating a detail of another embodiment of the clutch disk 1.

The embodiment of the clutch disk 1 illustrated in FIG. 6 also differs from that illustrated in FIG. 1 due to the fact that the second friction lining support 15 does not have bent side edges 21, 22 and the second friction lining support is barely any bigger than the second friction linings 13 in terms of surface area.

The embodiment of the clutch disk 1 and in particular the friction components 8 is otherwise made up of the same components and to avoid repetition, reference may be made to the description given in connection with FIG. 1 and FIG. 2.

In the case of all the embodiments of the clutch disk 1, all the first friction linings 12 are disposed on the first side 19 of the friction component 8—as viewed in the axial direction of the clutch disk 1—and all the second friction linings 13 are disposed on the second side 20 of the friction components 8 lying opposite the first side 19. Put more simply, the first side 19 may also be termed the front face and the second side 20 the rear face of the clutch disk 1 or vice versa.

However, it may also be that all the first friction linings 12 are disposed on the second side 20 and all the second friction linings 13 are disposed on the first side 19 of the friction component 8.

Alternatively, first friction linings 12 and second friction linings 13 may be disposed on both the first and the second side 19, 20, in which case the disposition is preferably such that the first friction linings 12 and the second friction linings 13 are disposed in an alternating arrangement in the circumferential direction of the clutch disk 1, i.e. a first friction lining 12 in the circumferential direction is followed by a second friction lining 13, which is in turn followed by a first friction lining 12 and so on.

In all of the embodiments, it is preferable if the first friction linings 12 and the second friction linings 13 have friction surfaces 27, 28 of the same size (illustrated in FIGS. 3 and 4) and are disposed completely overlapping one another in the friction components 8 in the axial direction of the clutch disk 1.

By friction surfaces 27, 28 of the same size is meant that the first and second friction linings 12, 13 have the same external dimensions and the same external contour.

Based on the design of the friction components 8 corresponding to the embodiments described above, their deflection from the neutral position in a first region 29 (FIG. 2) in the region of the flanges 9 can be reduced and can be increased in a second region 30 (FIG. 2) in the region of the external diameter of the clutch disk 1, compared in each case with double-sided spring-mounted friction linings, in other words without a rigid side.

A deflection from the neutral position at a rotation speed of 2000 rpm measured in the first region 29 was 0.05 mm and in the second region 30 was 0.1 mm.

By comparison, double-sided resilient friction linings have a deflection of 0.11 mm to 0.14 mm in the first region 29 at a speed of 2000 rpm.

The advantages described above are obtained due to the higher deflection of the wing-like friction components 8 in the second region 30 compared with the first region 29.

Further tests were conducted within the scope of the invention, which was compared with clutch disks known from the prior art in order to compile comparative data. The results are set out in Table 1.

Figure 5:
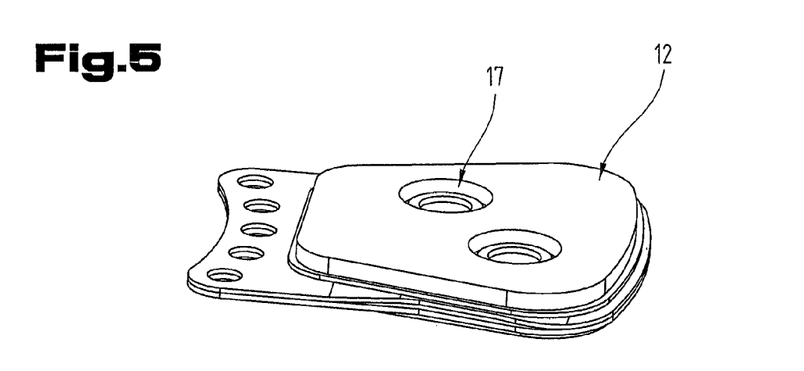
FIG. 5 another embodiment of a wing-like friction component viewed from an angle.

The variant used from the prior art was a clutch disk corresponding to FIG. 5 of U.S. Pat. No. 5,857,551 A.

The variant based on two lining rivets represents a clutch disk 1 in which the first friction linings 12 are each secured by two rivets 17 and designed as described above.

The variant based on four lining rivets represents a clutch disk 1 in which the first friction linings 12 are each secured by four rivets 17 and designed as described above.

TABLE 1

| | | | Measurement data | | | | |
|---|---|---|---|---|---|---|---|
| Variant | Inertia [kg/m$^2$] | Weight [kg] | Friction surface per friction lining with rivet [mm$^3$] | Friction surface per friction lining without rivet [mm$^3$] | Lining thickness with rivet [mm] | Lining thickness without rivet [mm] | Axial mounting space freed up [mm] |
| Prior art | 0.067 | 5.6 | 3593 | — | 3.57 | — | 12.85 |
| Two lining rivets | 0.0623 | 5.37 | 3593 | 4119 | 3.57 | 1.87 | 10.19 |
| Four lining rivets | 0.0617 | 5.35 | 3504 | 4119 | 3.45 | 1.9 | 10.1 |

As may be seen from Table 1, inertia can be reduced with the clutch disks 1 proposed by the invention because the clutch disks 1 are lower in weight.

The reduction of the friction surface (column 3) in the case of the embodiment based on four lining rivets is attributable to the fact that the four rivets 17 occupy more space, even though they are smaller than the two rivets 17 used in the embodiment with two lining rivets. However, the first friction linings 12 had the same external dimensions and the same external contours as the second friction linings 13.

As may also be seen from Table 1, the axial mounting space can be significantly reduced with the clutch disk 1 proposed by the invention (last column).

The examples of embodiments illustrate possible embodiments of the clutch disk 1 and it should be noted at this stage that various combinations of the individual embodiments with one another are also possible.

Finally, for the sake of good order, it should be pointed out that in order to provide a clearer understanding of the structure of the clutch disk 1, it and its constituent parts are illustrated to a certain extent out of scale and/or on a larger scale and/or on a smaller scale.

LIST OF REFERENCE NUMBERS

1 Clutch disk
2 Main part
3 Torsion spring
4 Orifice
5 Support element
6 Circumference
7 Receiving area
8 Friction component
9 Flange
10 Recess
11 Rivet
12 Friction lining
13 Friction lining
14 Friction lining support
15 Friction lining support
16 Spring element
17 Rivet
18 Gap
19 Side
20 Side
21 Side edge
22 Side edge
23 End face
24 End face
25 Orifice
26 Orifice
27 Friction surface
28 Friction surface
29 Region
30 Region

The invention claimed is:

1. Clutch disk for a friction clutch, comprising a disk-shaped main part with a support element, which support element has an outer circumference over which multiple receiving areas for friction components are distributed, the friction components being connected to the support element, and each friction component has a first friction lining and a second friction lining, and the first friction linings are arranged on first friction lining supports, the first friction lining support is connected to a spring element and the spring elements are connected to the support element, and the second friction linings are arranged on the second friction lining supports, and furthermore the spring elements are arranged between the first and the second friction lining supports, and the second friction lining supports are directly connected to the support element
wherein the friction components extend radially from the support element and furthermore the receiving areas are provided in the form of flanges on the support element projecting in the radial direction and recesses are provided between the flanges so that the individual flanges are not connected to one another in the circumferential direction and a separate flange is provided on the support element for each friction component, and the wing like friction components are connected to the support element in the receiving areas, for which purpose both the spring element and the second friction lining support are directly connected to the respective flange by means of rivets and/or are connected by a positive fit, for which purpose the spring element and the second friction lining support lie in direct abutment with one another in a connecting region and
wherein the second friction lining supports are bigger than the second friction linings so that the second friction linings are disposed at a distance apart from adjacently disposed side edges of the second friction lining supports on which they are disposed in the direction of the outer circumference, and the side edges of the second friction lining support are bent.

2. Clutch disk according to claim 1, wherein the second friction linings are connected to the second friction lining supports by means of a firmly bonded connection or by means of an adhesive bond.

3. Clutch disk according to claim a 1, wherein the second friction lining supports have at least one orifice in the region between the bent side edges and the second friction linings.

4. Clutch disk according to claim 1, wherein the first friction linings are connected to the first friction lining supports and the spring elements by means of at least four rivets.

5. Clutch disk according to claim 1, wherein all of the first friction linings are disposed on a first side of the friction component as viewed in the axial direction of the clutch disk and all of the second friction linings are disposed on a second side of the friction components lying opposite the first side.

6. Clutch disk according to claim 1, wherein the first friction linings and the second friction linings are disposed on a first side of the friction component and on a second side of the friction components lying opposite the first side—as viewed in the axial direction of the clutch disk—and the first friction linings and the second friction linings are disposed in an alternating arrangement in the circumferential direction of the clutch disk.

7. Clutch disk according to claim 1, wherein the first friction linings and the second friction linings have friction surfaces of the same size and are disposed in the friction components in a mutually overlapping arrangement in the axial direction of the clutch disk.

* * * * *

UNITED STATES PATENT AND TRADEMARK OFFICE
CERTIFICATE OF CORRECTION

PATENT NO.         : 9,995,346 B2
APPLICATION NO.    : 14/913546
DATED              : June 12, 2018
INVENTOR(S)        : Muehlegger It is certified that error appears in the above-identified patent and that said Letters Patent is hereby corrected as shown below:

In the Claims

In Column 10, Line 49, (Line 24 of Claim 1) before "friction component" please delete: "wing like".

Signed and Sealed this
Tenth Day of July, 2018

Andrei Iancu
*Director of the United States Patent and Trademark Office*